US012609746B2

(12) United States Patent
Liu

(10) Patent No.: US 12,609,746 B2
(45) Date of Patent: Apr. 21, 2026

(54) INFORMATION PROCESSING METHOD AND APPARATUS, COMMUNICATION DEVICE, AND STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 314 days.

(21) Appl. No.: 18/271,831

(22) PCT Filed: Jan. 13, 2021

(86) PCT No.: PCT/CN2021/071582
§ 371 (c)(1),
(2) Date: Jul. 11, 2023

(87) PCT Pub. No.: WO2022/151089
PCT Pub. Date: Jul. 21, 2022

(65) Prior Publication Data
US 2024/0088966 A1     Mar. 14, 2024

(51) Int. Cl.
*H04B 7/06* (2006.01)
*H04L 5/00* (2006.01)
*H04W 56/00* (2009.01)
*H04W 68/02* (2009.01)
*H04W 72/232* (2023.01)

(52) U.S. Cl.
CPC ......... *H04B 7/0626* (2013.01); *H04L 5/0051* (2013.01); *H04W 56/0015* (2013.01); *H04W 68/02* (2013.01); *H04W 72/232* (2023.01)

(58) Field of Classification Search
None
See application file for complete search history.

(56) References Cited

U.S. PATENT DOCUMENTS

| | | | | |
|---|---|---|---|---|
| 2021/0360586 A1* | 11/2021 | Nam | ..................... | H04L 1/0067 |
| 2023/0246764 A1* | 8/2023 | Laselva | ............... | H04L 27/2675 370/329 |
| 2023/0262652 A1* | 8/2023 | Fu | ......................... | H04L 5/0053 370/329 |
| 2024/0015741 A1* | 1/2024 | Tsai | ................... | H04L 25/0204 |

FOREIGN PATENT DOCUMENTS

| | | |
|---|---|---|
| CN | 111757346 A1 | 10/2020 |

OTHER PUBLICATIONS

Samsung, "Discussion on TRS/CSI-RS for idle/inactive UEs", 3GPP TSG RAN WG1 #103, R1-2008176, Oct. 2020, 6 pages.
Ericsson, "Provisioning of potential TRS/CSI-RS occasion(s) for Idle/Inactive UEs", 3GPP TSG RAN WG1 #103-e, R1-2009201, Oct. 2020, 12 pages.

(Continued)

*Primary Examiner* — Otis L Thompson, Jr.
(74) *Attorney, Agent, or Firm* — Cozen O'Connor

(57) ABSTRACT

In a method for processing information, a base station sends effective condition information for a reference signal. A user equipment receives the effective condition information for a reference signal. The effective condition information is configured to indicate an effective condition for using the reference signal for a first use.

14 Claims, 6 Drawing Sheets

UE base station

S210, receive effective condition information for a reference signal, in which the reference signal includes a TRS and/or a CSI-RS, the effective condition information is configured to indicate an effective condition for using the reference signal for a first use, and the first use includes: using the reference signal for the RRM measurement and/or The synchronization between the UE and the base station

(56) References Cited

OTHER PUBLICATIONS

Samsung, "Moderator summary for TRS/CSI-RS occasion(s) for idle/inactive UEs", 3GPP TSG RAN WG1 #103-e, R1-2008178, Oct. 2020, 52 pages.

European Patent Application No. 21918304.3 Search Report dated Sep. 23, 2024, 12 pages.

PCT/CN2021/071582, International Search Report dated Sep. 29, 2021, 3 pages.

* cited by examiner send effective condition information for a
reference signal

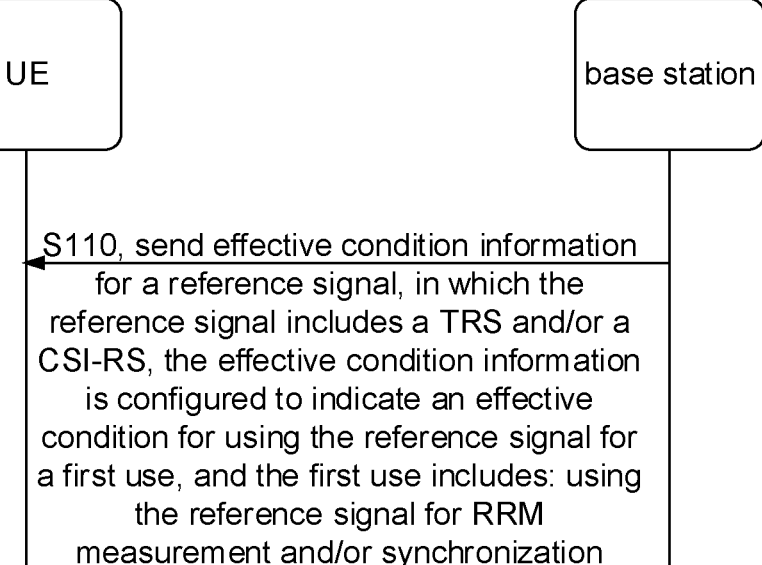

S110, send effective condition information for a reference signal, in which the reference signal includes a TRS and/or a CSI-RS, the effective condition information is configured to indicate an effective condition for using the reference signal for a first use, and the first use includes: using the reference signal for RRM measurement and/or synchronization between the UE and the base station

FIG. 2B

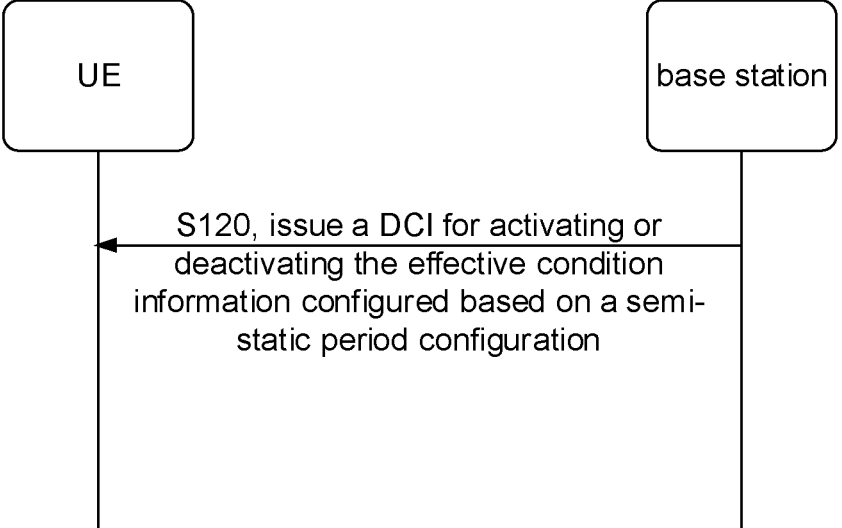

S120, issue a DCI for activating or deactivating the effective condition information configured based on a semi-static period configuration

FIG. 3

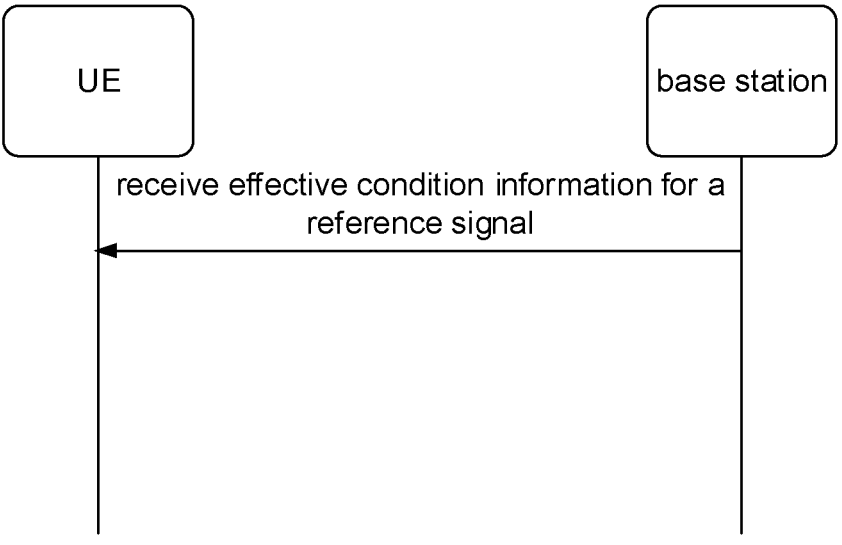

UE                                              base station receive effective condition information for a
reference signal

FIG. 4A

UE                                              base station

S210, receive effective condition
information for a reference signal, in which
the reference signal includes a TRS and/or
a CSI-RS, the effective condition
information is configured to indicate an
effective condition for using the reference
signal for a first use, and the first use
includes: using the reference signal for the
RRM measurement and/or The
synchronization between the UE and the
base station

FIG. 4B apparatus for processing information sending module 110 apparatus for processing information receiving module 210

INFORMATION PROCESSING METHOD AND APPARATUS, COMMUNICATION DEVICE, AND STORAGE MEDIUM

CROSS-REFERENCE TO RELATED APPLICATION

This application is a national phase of International Application No. PCT/CN2021/071582, filed on Jan. 13, 2021, the content of which is hereby incorporated by reference in its entirety.

TECHNICAL FIELD

The disclosure relates to, but is not limited to, a technical field of wireless communication, and in particular to methods for processing information, apparatuses for processing information, communication devices, and a storage medium.

BACKGROUND

User Equipment (UE) connected to a wireless communication network may enter a non-connected state, such as an idle state or an inactive state, when not communicating with a network side device to reduce power consumption. When a network side device needs to interact with the UE, it pages the UE through a paging message to cause the UE to exit the non-connected state and initiate a connection for entering a connected state, otherwise the UE will continue to maintain in the non-connected state with low power consumption. For a power saving UE, when the paging message has not been received, the power saving UE will maintain in a sleep state within a Discontinuous Reception (DRX) cycle to reduce power consumption.

SUMMARY

According to a first aspect of embodiments of the disclosure, a method for processing information performed by a base station is provided. The method includes: sending effective condition information for a reference signal, in which the effective condition information is configured to indicate an effective condition for using the reference signal for a first use.

According to a second aspect of embodiments of the disclosure, a method for processing information performed by a user equipment (UE) is provided. The method includes: receiving effective condition information for a reference signal, in which the effective condition information is configured to indicate an effective condition for using the reference signal for a first use.

According to a third aspect of embodiments of the disclosure, a communication device is provided. The communication device includes: a processor, a transceiver, a memory and an executable program stored on the memory and being executable by the processor. When the executable program is executed by the processor, the method of the first aspect or the method of the second aspect is performed.

According to a fourth aspect of embodiments of the disclosure, a computer storage medium is provided. The computer storage medium has an executable program stored thereon. When the executable program is executed by a processor, the method of the first aspect or the method of the second aspect is performed.

It is understandable that the above general description and the following detailed descriptions are illustrative and explanatory only and do not limit the embodiments of the disclosure.

BRIEF DESCRIPTION OF THE DRAWINGS

The accompanying drawings, which are incorporated in and constitute a part of this disclosure, illustrate embodiments consistent with the disclosure and together with the disclosure serve to explain principles of the embodiments of the disclosure.

FIG. 2B is a flowchart illustrating a method for processing information by a base station according to an embodiment.

FIG. 3 is a flowchart illustrating a method for processing information according to an embodiment.

FIG. 4A is a flowchart illustrating a method for processing information by a user equipment (UE) according to an embodiment.

FIG. 4B is a flowchart illustrating a method for processing information by a UE according to an embodiment.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit embodiments of the disclosure. The singular forms of "a" and "the" used in the disclosure and appended claims are also intended to include plural forms, unless the context clearly indicates other meanings. It is also understandable that the term "and/or" as used herein refers to and includes any or all possible combinations of one or more associated listed items.

It is understandable that although the terms "first", "second", and "third" may be used in embodiments of the disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

Figure 1:
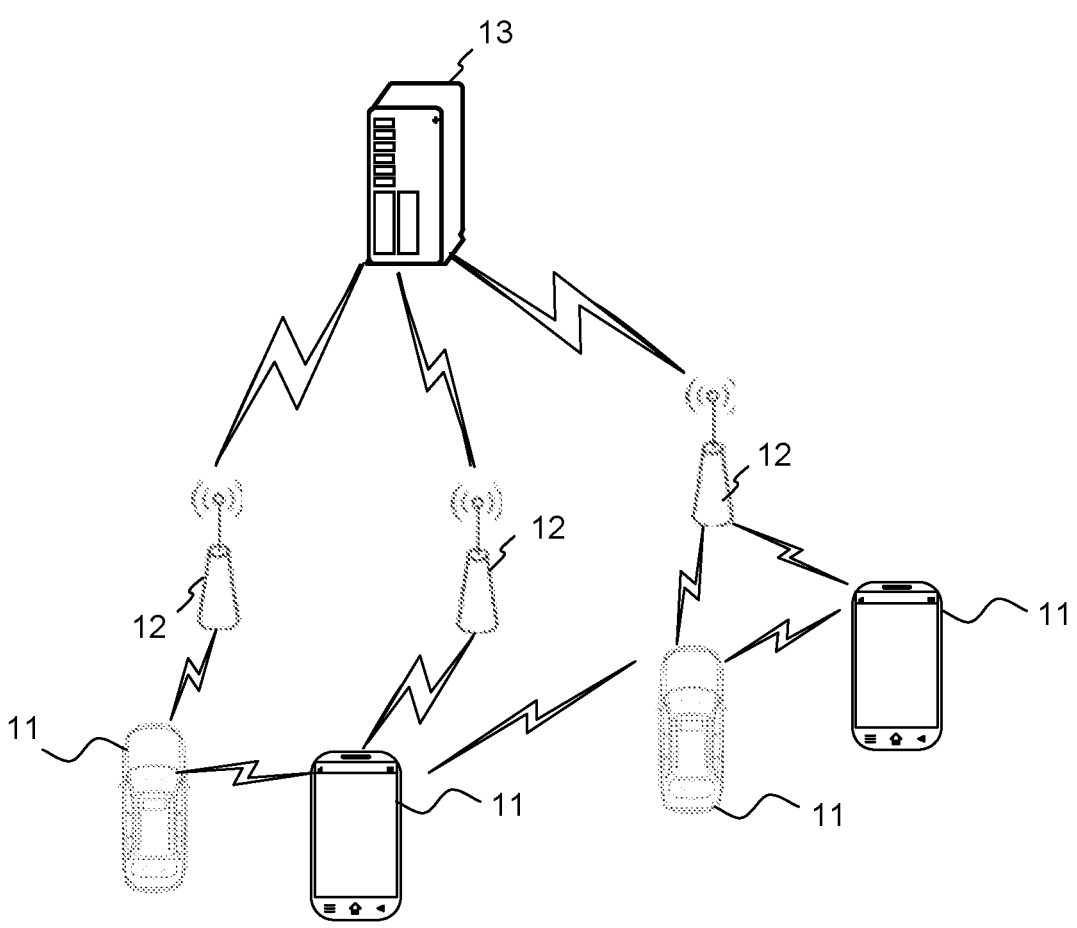
FIG. 1 is a schematic diagram illustrating a wireless communication system according to an embodiment.

FIG. 1 is a schematic diagram illustrating a wireless communication system according to an embodiment. As illustrated in FIG. 1, the wireless communication system is a communication system based on the cellular mobile communication technology. The wireless communication system may include: a plurality of user equipments (UEs) 11 and a plurality of base stations 12.

The UE 11 may be a device for providing voice and/or data connectivity to a user. The UE 11 may communicate with one or more core networks via a Radio Access Network (RAN). The UE 11 may be an Internet of Things (IoT) UE, such as a sensor device, a mobile phone (also called "cellular" phone), and a computer having the IoT UE, such as a stationary, portable, pocket-sized, handheld, computer-built, or vehicle-mounted device. For example, a Station (STA), a subscriber unit, a subscriber station, a mobile station, a mobile, a remote station, an access point, a remote terminal, an access terminal, a user terminal, a user agent, a user device, or a UE. Or, the UE 11 may be an unmanned aerial vehicle device. Or, the UE 11 may be an in-vehicle device, such as an Electronic Control Unit (ECU) having wireless communication function, or a wireless UE external to the ECU. Or, the UE 11 can also be a roadside device, such as a street light, a signal light, or other roadside devices having wireless communication function.

The base station 12 may be a network side device in the wireless communication system. The wireless communication system may be the 4th Generation (4G) mobile communication system, also known as Long Term Evolution (LTE) system. Or, the wireless communication system may also be a 5G system, also known as New Radio (NR) system or 5G NR system. Or, the wireless communication system may be any next generation system of the 5G system. The access network in the 5G system may be called New Generation-RAN (NG-RAN) or Manual Toll Collection (MTC) system.

The base station 12 can be an evolved base station (eNB) employed in the 4G system. Or, the base station 12 may be a base station (gNB) with a centralized-distributed architecture employed in the 5G system. When the base station 12 adopts a centralized distributed architecture, it usually includes a Central Unit (CU) and at least two Distributed Units (DUs). The CU is equipped with the protocol stacks of Packet Data Convergence Protocol (PDCP) layer, of Radio Link Control (RLC) layer, or of Media Access Control (MAC) layer. The DU is equipped with the protocol stack of the Physical (PHY) layer, and the specific implementation of the base station 12 is not limited in embodiments of the disclosure.

A wireless connection can be established between the base station 12 and the UE 11 via a radio interface. In different implementations, the radio interface is a radio interface based on the 4G standard. Or, the radio interface is a radio interface based on the 5G standard, such as NR. Or, the radio interface may also be a radio interface based on the standard of the next generation of 5G.

In some embodiments, End to End (E2E) connections can also be established between the UEs 11 in scenarios, such as, Vehicle to Vehicle (V2V) communication, Vehicle to Infrastructure (V2I) communication, and Vehicle to Pedestrian (V2P) communication in Vehicle to Everything (V2X) communication.

In some embodiments, the above wireless communication system may also include a network management device 13.

The plurality of base stations 12 are connected to the network management device 13 respectively. The network management device 13 may be a core network device in the wireless communication system, such as a Mobility Management Entity (MME) in an Evolved Packet Core (EPC). Or, the network management device may be another core network device, such as a Serving GateWay (SGW), a Public Data Network GateWay (PGW), a Policy and Charging Rules Function (PCRF), or a Home Subscriber Server (HSS), etc. The implementation form of the network management device 13 is not limited in embodiments of the disclosure.

Figure 2A:
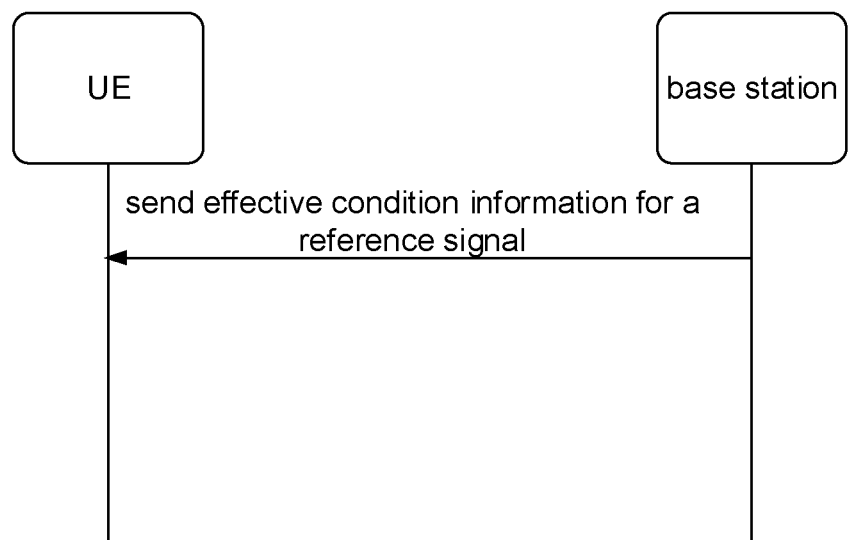
FIG. 2A is a flowchart illustrating a method for processing information by a base station according to an embodiment.

As illustrated in FIG. 2A, embodiments of the disclosure provide a method for processing information performed by a base station. The method includes:

sending effective condition information for a reference signal. The effective condition information is configured to indicate an effective condition for using the reference signal used for a first use.

Embodiments of this disclosure is applicable to a base station. The base station can be a network-side access device, such as an evolved Node B (eNB) or a 5th generation Node B (gNB).

The reference signal can be any reference signal other than a Synchronization Signal Block (SSB).

In embodiments of this disclosure, the reference signal may be a reference signal covering the entire cell or a reference signal covering a part of the cell.

In embodiments of this disclosure, the reference signal can be used to replace a part of or all of the SSB to achieve the use(s) of the SSB. That is, the above-mentioned "first use" may be one or more of the uses of the SSB.

For example, the reference signal includes, but is not limited to, a Tracking Reference Signal (TRS) and/or a Channel State Information Reference Signal CSI-RS. The original use(s) of the TRS and/or the CSI-RS herein may be called "second use" to be distinguished from the above "first use".

The "reference signal" mentioned here may include the TRS and/or CSI-RS which can be used to replace the measurement of SSB to achieve the RRM measurement of a current cell and/or a neighboring cell.

The reference signal may include the TRS and/or CSI-RS which can be used to replace the measurement of SSB, to achieve the synchronization between the UE and the base station of the current cell.

The TRS and/or CSI-RS may each originally be a reference signal issued to the UE that is in the connected state. For example, the CSI-RS can be used by the UE in the connected state for intra-cell channel measurement. The TRS can be used to determine a communication beam between the UE in the connected state and the base station.

In embodiments of this disclosure, condition information for the RRM measurement may be issued for the UE in the non-connected state. The UE in the non-connected state may at least include a UE in an idle state and/or a UE in an inactive state.

In an embodiment, the first use includes, but is not limited to, using the reference signal for the RRM measurement and/or for the synchronization between the UE and the base station.

The "RRM measurement" mentioned here includes, but is not limited to, performing by the UE the RRM measurement on the serving cell and/or performing by the UE the RRM measurement on a neighboring cell. The "serving cell" can also be referred to as "the current cell".

When the RRM measurement is performed on the current cell, the TRS/CSI-RS is a TRS/CSI-RS sent by the serving cell.

When the RRM measurement is performed on the neighboring cell, the TRS/CSI-RS is a TRS/CSI-RS sent by the neighboring cell.

The effective condition information may include one or more bits configured to at least indicate an additional use of the reference signal other than an original use of the reference signal, such as to perform one or more uses of the SSB.

For example, as illustrated in FIG. 2B, embodiments of the disclosure provide a method for processing information performed by a base station. The method includes the following.

At step S110, effective condition information for a reference signal is sent. The reference signal includes a TRS and/or a CSI-RS. The effective condition information is configured to indicate an effective condition for using the reference signal for a first use. The first use includes using the reference signal for a RRM measurement and/or for a synchronization between a UE and the base station.

The effective condition information may include one or more bits configured at least to indicate an effective condition for using the TRS/CSI-RS for the RRM measurement.

In an embodiment, the method further includes: issuing configuration information of the reference signal.

The configuration information includes: configuration information of the reference signal of the current cell and/or configuration information of the reference signal of the neighboring cell.

It is understandable that the RRM measurement may include the RRM measurement of a neighboring cell, and the method further includes: receiving configuration information of the reference signal of the neighboring cell; and issuing, in the current cell, the configuration information of the reference signal of the neighboring cell.

By receiving the configuration information of the reference signal of the neighboring cell and issuing, within the current cell, the configuration information of the reference signal, it is equivalent to informing the UE of the time-frequency resource information for sending the reference signal of the neighboring cell. Therefore, the UE can perform the measurement on the reference signal of the neighboring cell based on the configuration information of the reference signal of the neighboring cell.

In some cases, the configuration information of the reference signal sent by the neighboring cell is received periodically, and/or, the configuration information of the reference signal of the neighboring cell sent by the neighboring cell when the reference signal is updated is received.

In an embodiment, the reference signal may be a reference signal per cell and/or a reference signal per UE. If the RRM measurement involves the measurement of the reference signal of the neighboring cell, the reference signal may optionally be the reference signal per cell, so that all neighboring cells of a cell may share the reference signal per cell to perform the RRM measurement.

The effective condition information may be carried by a RRM measurement-related signaling issued by the base station to the UE. After successfully receiving the RRM measurement-related signaling, the UE does not directly perform the RRM measurement. Instead, the UE use by itself the reference signal to replace the SSB to achieve an effect of loosened RRM measurement in response to determining, based on the effective condition information extracted from the RRM measurement-related signaling, that the effective condition is satisfied.

After the effective condition information is issued, the UE can determine by itself whether to perform the RRM measurement according to the reference signal. If the condition indicated by the effective condition information is satisfied, the measurement of SSB is reduced for the idle state and the TRS and/or CSI-RS is used to replace the measurement of SSB, thereby reducing the time period within which the UE is in an awake state to measure the SSB, and reducing the power consumption of the UE. If the condition indicated by the effective condition information is not satisfied, the UE will not use the reference signal such as the TRS/CSI-RS to perform the RRM measurement, but will continue to use the SSB to perform the RRM measurement.

The measurement result of the RRM measurement can be used for mobility management of the UE.

For example, the network side and/or the base station may use the measurement result of the RRM measurement to instruct the UE to perform cell handover and/or cell reselection, so that the UE is always connected to a cell that currently has the best quality of communication with the UE.

The effective condition information includes various specific information contents. For example, the specific information contents of the effective condition information may be at least one of threshold information or an identifier of the effective condition.

The threshold information is configured to indicate one or more thresholds to make that the effective condition for performing the RRM measurement and/or the effective condition for performing the synchronization is satisfied; and For the identifier of the effective condition, for example, both the base station and the UE are allowed to know several candidate conditions that can be used as the effective conditions and to set corresponding identifiers for these candidate conditions. At least one of the corresponding identifiers can be carried in the effective condition information. Once the UE successfully receives the effective condition information, the UE will know the specific content of the effective condition for using the TRS/CSI-RS for the RRM measurement.

Certainly, the above are only examples of the effective condition information, and the specific implementations are not limited herein.

For example, the UE can measure both the SSB and the TRS and/or CSI-RS within the time when the UE is in the awake state, so that the UE can collect multiple sample points at one time point, which reduces the length of time spent for sampling various preset sample points and reduces the length of time of maintaining the UE in the awake state, thereby reducing the power consumption of the UE.

As another example, the bandwidth of the TRS and/or the CSI-RS may be larger than that of the SSB. If the measurement of the SSB is replaced by the measurement of the TRS and/or the CSI-RS, it may be possible to reduce the number of samples required in the process of the SSB measurement, thereby reducing the length of time of maintaining the UE in the awake state while reducing the power consumption of the UE.

In an embodiment, sending the effective condition information for the reference signal includes: sending the effective condition information for the reference signal in response to determining that there is configured the reference signal.

For example, the effective condition information for using the TRS/CSI-RS for performing the RRM measurement is issued only when there is configured the TRS/CSI-RS, otherwise the effective condition information for using the TRS/CSI-RS for performing the RRM measurement is not issued. On the one hand, unnecessary signaling overhead can be reduced. On the other hand, it reduces the UE's determination, based on the effective condition information, of whether the condition for using the TRS/CSI-RS for performing the RRM measurement is satisfied.

Embodiments of the disclosure provides a method for processing an effective condition for a reference signal. The method includes not sending the effective condition information for the reference signal in response to determining that there is not configured any reference signal.

In an embodiment, the step S110 may include sending the effective condition information via a high-layer signaling.

The high-layer signaling includes, but is not limited to, a Radio Resource Control (RRC) signaling and/or a MAC layer signaling.

The MAC signaling may at least include a MAC Control Element (CE).

In some embodiments, the effective condition information may also be sent via a broadcast signaling. The broadcast signaling includes, but is not limited to, a Main Information Block (MIB) and/or a System Information Block (SIB) 1.

In an embodiment, the effective condition information includes: first condition information and/or second condition information.

The first condition information is configured to indicate a first condition for allowing to use the reference signal for the RRM measurement.

The second condition information is configured to indicate a second condition for allowing to use the reference signal for the synchronization between the UE and the base station.

With issuing the first condition information, the UE can determine, based on the first condition information, whether to perform the RRM measurement through the TRS/CSI-RS.

With issuing the second condition information, the UE can determine, based on the second condition information, whether to perform the synchronization with the base station through the TRS/CSI-RS.

In some cases, the TRS/CSI-RS can be used for both the synchronization and/or the RRM measurement at the same time.

For example, in Case 1, the TRS/CSI-RS can be used for the RRM measurement when only the first condition indicated by the first condition information is satisfied. In Case 2, the TRS/CSI-RS can be used for the RRM measurement when only the second condition indicated by the second condition information is satisfied. In Case 3, the TRS/CSI-RS can be used for the RRM measurement when the first condition indicated by the first condition information is satisfied, and the TRS/CSI-RS can be used for the RRM measurement when the second condition indicated by the second condition information is satisfied.

In an embodiment, the first condition information includes: threshold information for allowing to use the reference signal for performing the RRM measurement.

The threshold information can indicate a single threshold and/or a threshold range limited by a plurality of thresholds. In this way, after successfully receiving the first condition information, the UE obtains the threshold information and can determine whether the first condition for using the reference signal for performing the RRM measurement is satisfied at the present based on the threshold(s) indicated by the threshold information.

In an embodiment, the threshold information indicates at least one of a signal-to-noise ratio threshold or a time difference threshold range.

For the signal-to-noise ratio threshold, it is determined that the first condition is satisfied when a signal-to-noise ratio of the reference signal is greater than the signal-to-noise ratio threshold.

For the time difference threshold range, it is determined that the first condition is satisfied when a transmission time difference between the reference signal and a SSB is within the time difference threshold range.

As an example, the UE measures the TRS/CSI-RS in the awake state to obtain the signal-to-noise ratio of the TRS/CSI-RS. If the signal-to-noise ratio is large enough, e.g., greater than the signal-to-noise threshold, the measurement result of the RRM measurement is obtained based on the TRS/CSI-RS, thereby ensuring the accuracy of the RRM measurement.

As another example, if the transmission time difference between the reference signal and the SSB is within the time difference threshold range, the measurement of the reference signal can be used to replace a part of or all of the SSB for performing the RRM measurement, which can reduce the power consumption generated by the UE due to RRM measurement.

For example, the transmission time difference between the reference signal and the SSB being within the time difference threshold range may include but not limited to that the time difference between the transmission time of the reference signal and the transmission time of the SSB is less than a first preset threshold. In this way, compared with measuring multiple SSBs, it can reduce the length of time during which the UE maintains in the awake state, thereby reducing the power consumption. The first preset threshold may be determined according to the transmission time difference between SSBs. For example, the first preset threshold is less than or equal to a transmission time difference between two adjacent SSBs, or less than the largest transmission time difference between SSBs.

For example, considering that the transmission bandwidth of the reference signal may be larger than the transmission bandwidth of the SSB, the transmission time difference between the reference signal and the SSB being within the time difference threshold range may also include but not limited to that the transmission time difference between the reference signal and the SSB is greater than a second preset threshold. If the reference signal and the SSB are located in different frequency bands respectively or after the bandwidth of the reference signal and the bandwidth of the SSB are overlapped, the bandwidth is relatively large. If the UE works on a relatively large bandwidth, it also has a relatively large bandwidth. At this time, if the transmission time difference between the reference signal and the SSB is greater than the second preset threshold, the size of the bandwidth to be measured by the UE can be reduced when the SSB and the reference signal are overlapped in the time domain. For example, the second preset threshold may be greater than or equal to 0.

The preset range may be determined by the network side based on the configuration of the reference signal and the configuration of the SSB. The upper limit value and the lower limit value of this preset range may be received by the UE as the threshold information sent by the network side in the same way as the signal-to-noise ratio threshold.

In an embodiment, the first condition for allowing to use the reference signal for the RRM measurement includes at least one of followings: the signal-to-noise ratio of the reference signal being greater than the signal-to-noise threshold; the transmission time difference between the reference signal and the SSB being within the time difference threshold; or successfully receiving an effective indication carried by a paging Downlink Control Information (DCI).

In an embodiment, sending the effective indication through the paging DCI may be a condition parallel to the first condition corresponding to the threshold information carried by the first condition information.

In another embodiment, sending the effective indication through the paging DCI may be a supplementary condition to the first condition corresponding to the threshold information carried by the first condition information. For example, when the threshold information of the first condition information is empty, it is equivalent to informing the UE that the condition of allowing to use the reference signal for performing the RRM measurement is satisfied or effectuated once successfully receiving the effective indication carried by the paging DCI.

In some cases, the base station may also issue the effective indication, to indicate the UE to perform the RRM measurement using the TRS/CSI-RS. The effective indication may be carried by various kinds of DCI. Issuing the DCI has the characteristic of fast delivery rate.

In some embodiments, satisfying the first condition may include: successfully receiving the effective indication carried by the paging DCI.

In embodiments of the disclosure, in order to reduce the introduction of new DCI, the paging DCI is used to carry the effective indication. The paging DCI may be a DCI for sending the resource information of the paging message. By adding the indication bits in the paging DCI, when the UE monitors the paging DCI in the awake state, the UE can synchronously monitor the effective condition information for using the reference signal for the RRM measurement, without needing to wake up at an additional occasion to monitor the effective indication, thereby further reducing the power consumption of the UE.

For example, the effective indication may be a reserved bit or a reserved bit value in the paging DCI. For example, the reserved bit may be a temporarily reserved bit that is not allocated to any information. The bit corresponding to the reserved bit value may have been allocated to other information, but some bit values of this bit have not been used, and such unused bit values may be considered as reserved values. For example, two bits have 4 values, 3 of which have been used to indicate other information, and indication information of the left one value can be used as an effective bit. At this time, if the value of the two bits is any one of the above-mentioned 3 values, it can be considered that the base station does not issue any effective bit, so that the UE cannot receive any effective bit. If the value of the two bits is another value other than the above-mentioned 3 values, it is considered that the base station has sent the effective bit, and the UE will successfully receive the effective bit carried in the paging DCI by receiving the paging DCI.

The above is an example of the effective condition for using the reference signal for the RRM measurement as indicated by the effective condition information, and other examples may be possible for specific implementations. For example, if Reference Signal Received Power (RSRP) or Reference Signal Received Quality (RSPQ) of the TRS/CSI-RS is measured to be greater than a corresponding threshold, it can be determined that the effective condition of using the reference signal for the RRM measurement is satisfied.

In an embodiment, the paging DCI carries not only the indication bit(s) of the resource parameters of a Paging Occasion (PO), but also the effective bit(s), so that the contents carried by the paging DCI increase.

In another embodiment, successfully receiving the effective indication carried by the paging DCI further includes: successfully receiving the effective indication carried by the paging DCI in a current PO cycle or previous M cycles. M is a positive integer greater than or equal to 2.

In an embodiment, the effective indication is carried by reserved bit(s) of the paging DCI.

In an embodiment, successfully receiving the effective indication carried by the paging DCI includes: successfully receiving the effective indication carried by the paging DCI of the last PO cycle. The indication carried by the paging DCI successfully received in the last PO cycle is used as the effective indication for using the reference signaling for the RRM measurement in a current PO paging cycle.

If the effective indication carried by the paging DCI is used, after successfully receiving the effective indication for allowing to use the reference signal for the RRM measurement in the last PO cycle, the TRS/CSI-RS is automatically used for the RRM measurement in the current PO cycle.

If the effective indication for indicating that the reference signal is allowed to be used for performing the RRM measurement in the current PO cycle, which is carried by the paging DCI in the last PO cycle, is successfully received, then it is determined that the first condition is satisfied. This is equivalent to that the duration of determining whether the first condition is satisfied once is one PO cycle. By indicating whether the first condition is satisfied in the current PO cycle using the effective indication carried by the paging DCI of the last PO cycle, the base station can flexibly and dynamically inform the UE of whether to use the reference signal for the RRM measurement.

In an embodiment, successfully receiving the effective indication carried by the paging DCI includes: in response to determining that the first condition information does not carry the threshold information, successfully receiving the effective indication carried by the paging DCI.

This situation is applicable to a case that if the network side does not determine appropriate threshold information, the network side sends the effective condition information first and then notifies, through the effective indication carried by the paging DCI, the UE that using the reference signal for performing the RRM measurement is effectuated.

In an embodiment, the first condition information includes a threshold field and an indication field. The threshold field carries the threshold information. The indication field is used to indicate whether to use the successfully received effective bits to indicate using the reference signal for the RRM measurement. At this time, when the effective condition information does not carry the threshold information, the first condition information not carrying the threshold information may include that the threshold field where the preset information is located is empty; and/or, a bit sequence carried by the threshold field is a preset bit sequence; and/or, in another embodiment, a bit value carried in the indication field indicates that the successfully received effective indication is effectuated.

In another embodiment, the first condition information may include the threshold field and not include the indication field. If the threshold field is empty or is the preset bit sequence, it implicitly indicates that whether the effective bit(s) is/are successfully received is used to determine whether to use the reference signal for performing the RRM measurement.

In an embodiment, the effective condition information is configured based on a semi-static period configuration.

In some embodiments, the effective condition information is configured based on the semi-static period configuration, which means that the effective condition information is configured in a semi-static period manner or is scheduled in a semi-static period manner. That is, the effective condition information is effectuated in the scheduled semi-static period, and ineffective in the unscheduled period.

In this way, if the effective condition information takes effect in a certain semi-static period, it means that the effective condition information is effectuated in the semi-static period, and the UE can determine, based on the effective condition information, whether to use the reference signal for performing the RRM measurement and/or for performing the synchronization between the UE and the base station. Otherwise, the UE does not need to determine, based on the effective condition information, to use the reference signal for performing the RRM measurement and/or performing the synchronization between the UE and the base station.

On the one hand, the use of semi-static period configuration can realize periodic configuration. On the other hand, flexible control between the effectiveness and invalidation of the configuration is realized by activating or deactivating the semi-static period configuration.

As illustrated in FIG. 3, the method for processing effective condition information for the reference signal according to embodiments of the disclosure further includes the following.

At step S120, a DCI for activating or deactivating the effective condition information configured based on the semi-static period configuration is issued.

The method for processing effective condition information for the reference according to embodiments of the disclosure may be used alone, or may be used in combination with the method shown in FIGS. 2A, 2B and the like.

In the embodiments, the DCI is used to activate or deactivate the semi-static period configuration. That is, the DCI indicates a period range in which the effective condition works or indicates a period range in which the effective condition does not work.

The effective condition information is configured based on the semi-static period configuration, so that the activation indication carried by the DCI can be used for activating if the effective condition information is effectuated in periods corresponding to some semi-static periods and/or, the deactivation indication carried by the DCI can be used for deactivating if the effective condition information is ineffective during periods corresponding to some semi-static periods. If the effective condition information is deactivated in a semi-static period, it means that the effective condition information does not take effect during the semi-static period, and the UE does not need to determine, based on the effective condition information, whether to use the reference signal for the RRM measurement and/or the synchronization between the UE and the base station. If the effective condition information is activated in a certain semi-static period, it means that the effective condition information is effective in the semi-static period, and the UE can determine, based on the effective condition information, whether to use the reference signal for the RRM measurement and/or the synchronization between the UE and the base station.

In an embodiment, the DCI may be the aforementioned paging DCI, or any DCI, other than the paging DCI, that does not carry the resource parameters of the paging message.

It is understandable that in some embodiments, the base station firstly issues the effective condition information for the reference signal, and issues the DCI to activate the effective condition information in or before the semi-static period during which the effective condition information needs to be activated to work. In this way, within the semi-static period when the effective condition information is activated, the UE will determine by itself whether the effective condition for using the reference signal for performing the RRM measurement and/or the synchronization with the base station is satisfied. If the corresponding condition is satisfied, the detection of the reference signal is used to perform the RRM measurement and/or to achieve the synchronization between the UE and the base station.

As illustrated in FIG. 4A, embodiments of the disclosure provide a method for processing information performed by a UE. The method includes:

receiving effective condition information for a reference signal, in which the effective condition information is configured to indicate an effective condition for using the reference signal for a first use.

The method for processing a reference signal is a method performed by the UE. The UE may be any type of UE.

In some embodiments, the UE may be a UE that supports a DRX mode or an extended-DRX (e-DRX) mode.

The UE can receive the effective condition information in a connected state or in a non-connected state. The non-connected state herein may include: an idle state or an inactive state.

After successfully receiving the effective condition information, after entering the non-connected state, it may be determined, based on the effective condition information, to use the reference signal for the first use.

The "reference signal" mentioned here includes but is not limited to the aforementioned TRS and/or CSI-RS.

The "first use" mentioned here includes but is not limited to: the RRM measurement and/or the synchronization between the UE and the base station.

As illustrated in FIG. 4B, embodiments of the disclosure provide a method for processing information performed by a UE. The method includes the following.

At step S210, effective condition information for a reference signal is received. The reference signal includes a TRS and/or a CSI-RS. The effective condition information is configured to indicate an effective condition for using the reference signal for a first use. The first use includes using the reference signal for the RRM measurement and/or the synchronization between the UE and a base station.

The method for processing a reference signal is a method performed by the UE. The UE may be any type of UE.

After successfully receiving the effective condition information, the UE may determine, based on the effective condition information, to use the reference signal for the RRM measurement and/or the synchronization between the UE and the base station after entering the non-connected state.

If the condition indicated by the effective condition information is not satisfied when needing to perform the RRM measurement, the UE does not use the reference signal, such as the TRS/CSI-RS, for performing the RRM measurement. Instead, the UE continues to use the SSB for performing the RRM measurement. For example, the measurement result of the RRM measurement of the current cell can be obtained by measuring the SSB of the current cell, and the measurement result of the RRM measurement of the neighboring cell can be obtained by measuring the SSB of the neighboring cell.

It is noteworthy that the "RRM measurement" mentioned here may include: the RRM measurement of the current cell and/or the RRM measurement of the neighboring cell.

If the condition indicated by the effective condition information is not satisfied when needing to perform the synchronization with the base station, the UE will not use the reference signal, such as the TRS/CSI-RS, for performing the synchronization. Instead, the UE continues to use the SSB for performing the synchronization with the base station.

In the disclosure, when successfully receiving the effective condition information, when needing to perform the RRM measurement and/or based on the transmission occasion of the TRS/CSI-RS, the UE determines, based on the effective condition information, whether the condition for using the TRS/CSI-RS for performing the RRM measurement is satisfied. If the condition is satisfied, the UE measures the TRS/CSI-RS when the reference signal such as the TRS/CSI-RS is issued and obtains the measurement result of the RRM measurement based on the measurement result of the TRS/CSI-RS.

In an embodiment, the step S210 may include receiving the effective condition information sent via a high-layer signaling.

In embodiments of the disclosure, the effective condition information is carried in the high-layer signaling. The high-layer signaling includes, but is not limited to, a RRC signaling and/or a MAC layer signaling.

In an embodiment, the effective condition information includes: first condition information and/or second condition information.

The first condition information is configured to indicate a first condition for allowing to use the reference signal for the RRM measurement.

The second condition information is configured to indicate a second condition for allowing to use the reference signal for the synchronization between the UE and the base station.

The relevant descriptions of the first condition information and the second condition information herein can be found in the preceding embodiments and will not be repeated herein.

The first condition information includes: threshold information for indicating to allow to use the reference signal for performing the RRM measurement.

The threshold information may be: a specific value and/or a threshold index of a corresponding threshold. All in all, the threshold information is information that can be used by the UE to determine the corresponding threshold.

In an embodiment, the threshold information indicates at least one of a signal-to-noise ratio threshold or a time difference threshold range.

For the signal-to-noise ratio threshold, it is determined that the first condition is satisfied when a signal-to-noise ratio of the reference signal is greater than the signal-to-noise ratio threshold.

For the time difference threshold range, it is determined that the first condition is satisfied when a transmission time difference between the reference signal and a SSB is within the time difference threshold range.

In an embodiment, if the signal-to-noise ratio of the reference signal specified by the signal-to-noise threshold is sufficiently large, it is considered that the first condition is satisfied.

In another embodiment, the transmission time difference between the reference signal and the SSB in the time domain is determined based on the configuration information of the reference signal and the SSB, and it is considered that the first condition is satisfied when the transmission time difference is within the time difference threshold.

In another embodiment, the threshold information may indicate both the signal-to-noise ratio threshold and the time difference threshold range. It is considered that the first condition is satisfied when the signal-to-noise ratio of the reference signal is greater than the signal-to-noise ratio threshold and the transmission time difference between the reference signal and the SSB is within the time difference threshold range.

In an embodiment, satisfying the first condition includes: successfully receiving an effective indication carried by a paging DCI.

The base station can also indicate, through the paging DCI, the UE in the non-connected state to use the reference signal for performing the RRM measurement.

In an embodiment, the paging DCI carries effective bit(s).

It is understandable that successfully receiving the effective indication carried by the paging DCI includes successfully receiving the effective indication carried by the paging DCI in response to determining that the first condition information does not carry the threshold information.

In embodiments of the disclosure, if the first effective condition in the effective condition information successfully received by the UE does not carry the threshold information, the UE will determine whether the paging DCI carries the effective indication. If the effective indication is successfully received, it is determined that the first condition is satisfied. If the effective indication is not successfully received, it is considered that the first condition is not satisfied. If the first condition is satisfied, the UE will use the reference signal to perform the RRM measurement, and if the first condition is not satisfied, the UE will not use the reference signal to perform the RRM measurement.

In an embodiment, the effective indication is carried by a reserved bit of the paging DCI.

The effective indication may be carried by the paging DCI in the current PO cycle or may be carried by the paging DCI in the previous M PO cycles.

In an embodiment, successfully receiving the effective indication carried by the paging DCI includes: successfully receiving the effective indication carried by paging DCI of a last PO period.

If the effective indication carried by the paging DCI of the last PO cycle is successfully received in the current PO cycle, it is determined that the first condition is satisfied, which is equivalent to that the duration for determining whether the first condition is satisfied once is one PO cycle. The effective indication carried by the paging DCI in the last PO cycle is used to indicate whether the first condition is satisfied in the current PO cycle, such that the base station can flexibly and dynamically inform the UE of whether to use the reference signal to perform the RRM measurement.

In an embodiment, the effective condition information is configured based on a semi-static period configuration.

The use of semi-static period configuration can realize periodic configuration of the effective condition information. Meanwhile, flexible control between the effectiveness and invalidation of the effective condition information is realized by activating or deactivating the semi-static period configuration.

Figures 5, 6, 7:
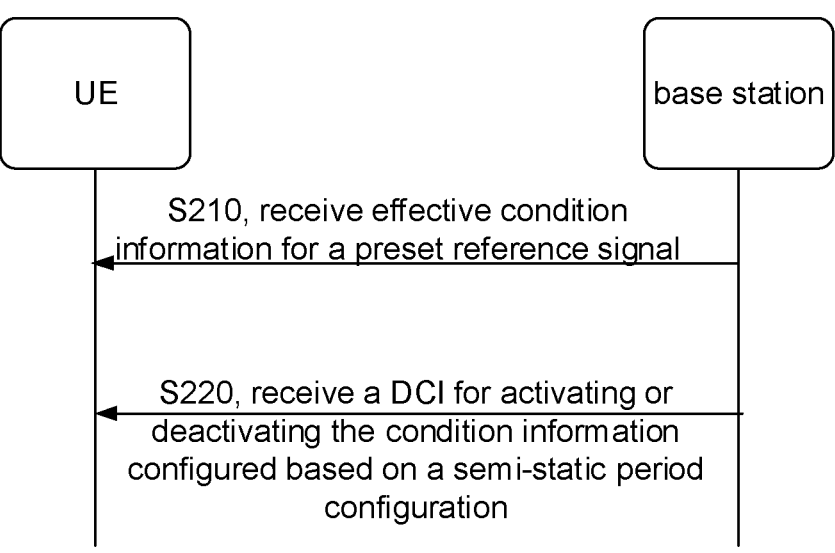
FIG. 5 is a flowchart illustrating a method for processing information according to an embodiment.
FIG. 6 is a schematic diagram illustrating an apparatus for processing effective condition information of a reference signal, applied to a base station, according to an embodiment.
FIG. 7 is a schematic diagram illustrating an apparatus for processing effective condition information of a reference signal, applied to a UE, according to an embodiment.

In an embodiment, as illustrated in FIG. 5, the method further includes the following.

At step S220, a DCI for activating or deactivating the condition information configured based on the semi-static period configuration is received.

The DCI can indicate the semi-static period within which the effective condition information works.

As illustrated in FIG. 6, embodiments of the disclosure provide an apparatus for processing information, which is applied to a base station. The apparatus includes a sending module 110.

The sending module 110 is configured to send effective condition information for a reference signal. The effective condition information is configured to indicate an effective condition for using the reference signal for a first use.

It is understandable that the reference signal includes: a TRS and/or a CSI-RS.

It is understandable that the first use includes using reference signal to perform the RRM measurement and/or the synchronization between a UE and the base station.

For example, the sending module 110 is configured to send the effective condition information for the reference signal. The reference signal includes a TRS and/or a CSI-RS. The effective condition information is configured to indicate an effective condition for the using reference signal for a first use. The first use includes: using the reference signal to perform the RRM measurement and/or the synchronization between a UE and the base station.

In an embodiment, the sending module 110 includes: a program module. After the program module is executed by a processor, the sending of the effective condition information can be achieved.

In another embodiment, the sending module 110 includes: a hardware and software combined module. The hardware and software combined module includes various programmable arrays. The programmable arrays include but are not limited to: field programmable arrays and/or complex programmable arrays.

In some embodiments, the sending module 110 may include: a pure hardware module. The pure hardware module includes but is not limited to: an application-specific integrated circuit.

In some embodiments, the sending module 110 is configured to send the effective condition information via a high-layer signaling.

In some embodiments, the effective condition information includes: first condition information and/or second condition information.

The first condition information is configured to indicate a first condition for allowing to use the reference signal for the RRM measurement.

The second condition information is configured to indicate a second condition for allowing to use the reference signal for the synchronization between the UE and the base station.

In some embodiments, the first condition information includes: threshold information for allowing to use the reference signal for the RRM measurement.

In some embodiments, the threshold information indicates at least one of: a signal-to-noise ratio threshold or a time difference threshold range.

For the signal-to-noise ratio threshold, it is determined that the first condition is satisfied when a signal-to-noise ratio of the reference signal is greater than the signal-to-noise ratio threshold.

For the time difference threshold range, it is determined that the first condition is satisfied when a transmission time difference between the reference signal and a SSB is within the time difference threshold range.

In some embodiments, satisfying the first condition includes: successfully receiving an effective indication carried by a paging DCI.

In some embodiments, successfully receiving the effective indication carried by the paging DCI includes: in response to determining that the first condition information does not carry the threshold information, successfully receiving the effective indication carried by the paging DCI.

In some embodiments, the effective indication is carried by reserved bit(s) of the paging DCI.

In some embodiments, successfully receiving the effective indication carried by the paging DCI includes: successfully receiving an effective indication carried by paging DCI of a last PO period.

In some embodiments, the effective condition information is configured based on a semi-static period configuration.

In some embodiments, the sending module 110 is configured to issue a DCI for activating or deactivating the semi-static period configuration.

As illustrated in FIG. 7, embodiments of the disclosure provides an apparatus for processing information, which is applied to a UE. The apparatus includes a receiving module 210.

The receiving module 210 is configured to receive effective condition information for a reference signal. The effective condition information is configured to indicate an effective condition for using the reference signal for a first use.

In an embodiment, the reference signal includes: a TRS and/or a CSI-RS.

In another embodiment, the first use includes: using the reference signal for the RRM measurement and/or the synchronization between the UE and a base station.

For example, the receiving module 210 is configured to receive the effective condition information for the reference signal. The reference signal includes a TRS and/or a CSI-RS. The effective condition information is configured to indicate an effective condition for using the reference signal for the first use. The first use includes: using the reference signal for the RRM measurement and/or the synchronization between the UE and the base station.

In an embodiment, the receiving module 210 includes: a program module. After the program module is executed by a processor, the receiving of the effective condition information can be achieved.

In another embodiment, the receiving module 210 includes: a hardware and software combined module. The hardware and software combined module includes various programmable arrays. The programmable arrays include but are not limited to: field programmable arrays and/or complex programmable arrays.

In some embodiments, the receiving module 210 may include: a pure hardware module. The pure hardware module includes but is not limited to: an application-specific integrated circuit.

In an embodiment, the receiving module 210 is configured to receive the effective condition information via a high-layer signaling.

In an embodiment, the effective condition information includes: first condition information and/or second condition information.

The first condition information is configured to indicate a first condition for allowing to use the reference signal for the RRM measurement.

The second condition information is configured to indicate a second condition for allowing to use the reference signal for the synchronization between the UE and the base station.

In an embodiment, the first condition information includes: threshold information for allowing to use the reference signal for performing the RRM measurement.

In an embodiment, the threshold information indicates at least one of a signal-to-noise ratio threshold or a time difference threshold range.

For the signal-to-noise ratio threshold, it is determined that the first condition is satisfied when a signal-to-noise ratio of the reference signal is greater than the signal-to-noise ratio threshold.

For the time difference threshold range, it is determined that the first condition is satisfied when a transmission time difference between the reference signal and a SSB is within the time difference threshold range.

In an embodiment, satisfying the first condition includes successfully receiving an effective indication carried by a paging DCI.

In an embodiment, successfully receiving the effective indication carried by the paging DCI includes: in response to determining that the first condition information does not carry the threshold information, successfully receiving the effective indication carried by the paging DCI.

In an embodiment, the effective indication is carried by reserved bit(s) of the paging DCI.

In an embodiment, successfully receiving the effective indication carried by the paging DCI includes: successfully receiving an effective indication carried by the paging DCI of a last PO period.

In an embodiment, the effective condition information is configured based on a semi-static period configuration.

In an embodiment, the receiving module 210 is configured to receive a DCI for activating or deactivating the condition information configured based on the semi-static periodic configuration.

The paging process includes detecting a Physical Downlink Control Channel (PDCCH) from a search space corresponding to the PO, and then decoding the paging DCI. If the paging resource parameters in the paging DCI are obtained after the decoding, the paging message sent at the PO of a Physical Downlink Shared Channel (PDSCH) is received according to the paging resource parameters. The UE can decode the paging message. If the paging identifier (ID) in the paging message is the UE's own ID, the UE initiates a connection, and otherwise the UE maintains in the sleep state. If no DCI is obtained after the decoding, it means that the UE is not paged during this DRX on cycle.

The DRX of UE in the idle/non-connected state is the process that taking a period T as a reference, the UE wakes up to receive the paging near the PO within the period T.

In embodiments of the disclosure, the UEs in the inactive state, such as the idle/inactive state, share the TRS/CSI-RS configuration of the connected state.

The reference signal of the connected state is actually oriented towards the cell or a group of UEs (although the configuration is based on the UE granularity or per UE).

It is currently assumed that the UE performs fine synchronization by receiving the SSBs of 3 cycles at the non-cell center. If the UE knows that there is configured the TRS/CSI-RS, then the UE can perform the synchronization using the SSB of one cycle, which is actually using the TRS/CSI-RS.

In some embodiments, the TRS/CSI-RS is configured periodically, and it is more likely to be configured in the time domain location of the SIB, but other RRC signaling is not excluded.

The sharing of the TRS/CSI-RS is configured, whether to notify the UE if on/off is also to be discussed in embodiments of this disclosure. The Energy Per Resource element (EPRE) of the TRS/CSI-RS is a configured value relative to the SSB. Based on the configuration value, the RRM measurement can be performed and/or the synchronization between the UE and the base station can be performed.

In an embodiment, the base station can send configuration condition information of the shared TRS/CSI-RS that can be used for performing the RRM measurement in the current cell.

Understandably, the condition is an effective condition configured through a high-layer signaling and is configured to indicate whether to allow to use the shared TRS/CSI-RS for the RRM measurement in the current cell.

For example, the effective condition may include: in response to determining that the signal-to-noise ratio of the reference signal is greater than a certain threshold A, effectuating the measurement manner of using the TRS/CSI-RS for the RRM measurement.

For example, the effective condition may also include: in response to determining that a time difference between the reference signal and the SSB is greater than t, effectuating the measurement manner of using TRS/CSI-RS for the RRM measurement.

In an embodiment, the base station can also use the DCI of a last PO cycle to indicate the UE in the idle state or the inactive state to use the RRM measurement in a current PO cycle.

The bit(s) for indicating whether or not the paging DCI is effective carried by the paging DCI can be reserved bit(s) in the paging DCI.

The configuration of the TRS/CSI-RS is a semi-static configuration, while the DCI is equivalent to a dynamic effective switch based on this, similar to a semi-static switch.

The configuration of the TRS/CSI-RS here includes, but is not limited to, the configuration of the aforementioned effective condition for the TRS/CSI-RS and/or the resource configuration of the TRS/CSI-RS. The resource configuration at least includes the resource parameters of the TRS/CSI-RS.

After receiving the above configuration, the UE determines, based on the information configured through the high-layer signaling, whether the reference signal such as the shared TRS/CSI-RS can be used for the RRM measurement in the current cell. If the reference signal can be used for the RRM measurement, it is equivalent to achieving loosened RRM measurement. The loosened RRM measurement here refers to reducing the number of SSBs to be measured and/or reducing the number of the sampling points of SSBs to be measured when performing the RRM measurement.

If it is satisfied, the UE uses the above reference signal to perform the RRM measurement, otherwise the UE continues to use the SSB to perform the RRM measurement.

After the effective condition is satisfied, the UE also needs to determine whether the reference signal such as the TRS/CSI-RS can be used for the measurement of the current cell in the current cycle based on the DCI of the last PO.

Embodiment of the disclosure provides a communication device. The communication device includes: a memory for storing instructions executable by a processor; and a processor connected to the memory.

The processor is configured to perform the method for processing effective condition information for the reference signal according to any of the preceding technical solutions.

The processor may include various types of storage mediums. The storage medium can be a non-transitory computer storage medium that can continue to memorize and store information on the communication device after it is powered down.

The communication device includes a base station or a UE.

The processor may be connected to the memory via a bus, etc., for reading executable programs stored on the memory, such as, at least one of the methods shown in FIG. 2A, FIG. 2B, FIG. 3, FIG. 4A, FIG. 4B to FIG. 5.

Figure 8:
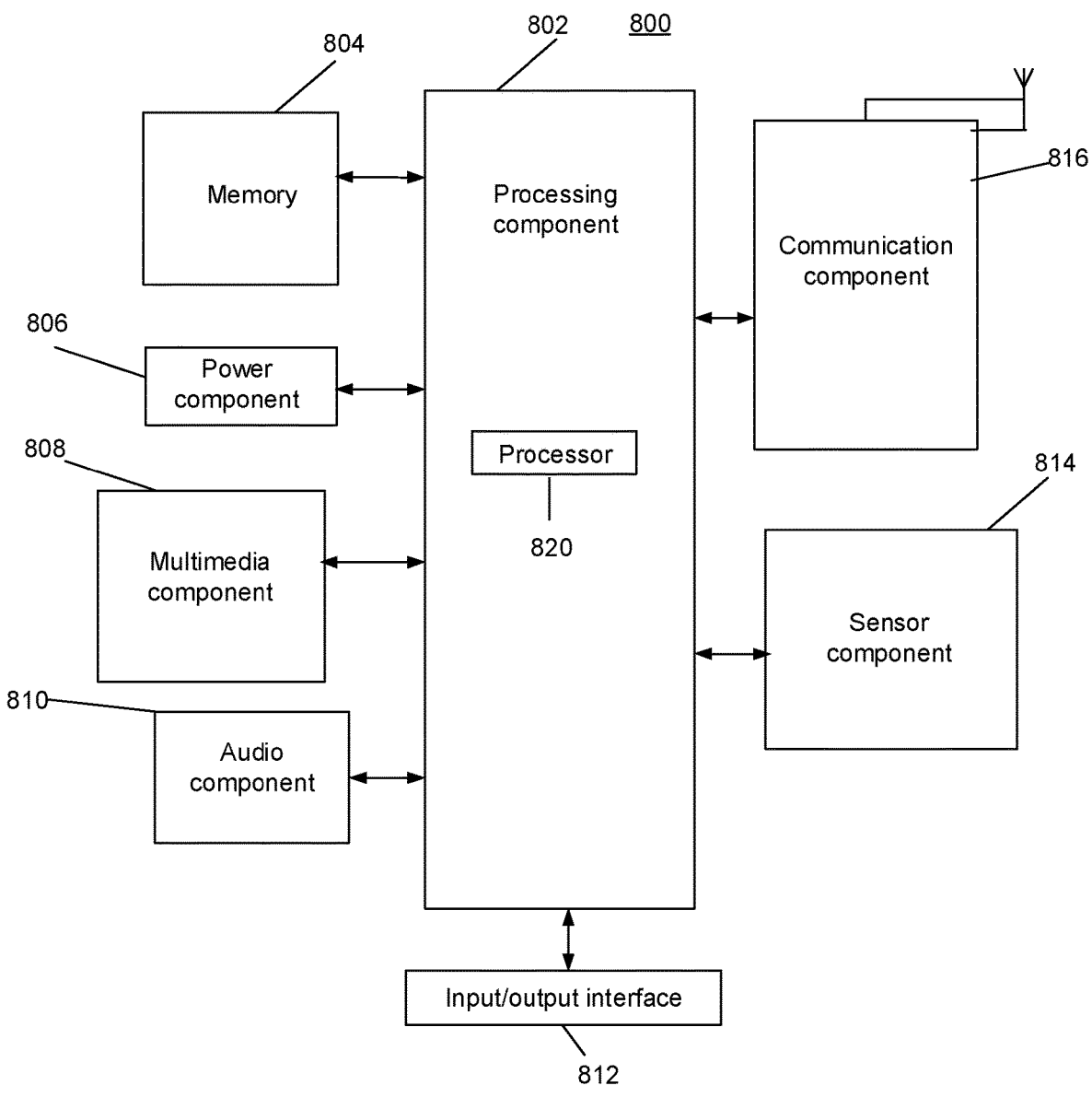
FIG. 8 is a schematic diagram illustrating a UE according to an embodiment.

FIG. 8 is a schematic diagram illustrating a UE 800 according to an embodiment. For example, the UE 800 may be a mobile phone, a computer, a digital broadcasting UE, a message transceiver device, a game console, a tablet device, a medical device, a fitness device and a personal digital assistant.

As illustrated in FIG. 8, the UE 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the UE 800, such as the operations associated with display, telephone calls, data communications, camera operations, and recording operations. The processing component 802 may include one or more processors 820 to perform all or part of the steps in the above described method. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operation of the UE 800. Examples of such data include instructions for any applications or methods operated on the UE 800, contact data, phonebook data, messages, pictures, video, etc. The memory 804 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic or optical disk.

The power component 806 provides power to various components of the UE 800. The power component 806 may include a power management system, one or more power sources, and any other components associated with the generation, management, and distribution of power in the UE 800.

The multimedia component 808 includes a screen providing an output interface between the UE 800 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensor may not only sense a boundary of a touch or swipe action, but also sense a period of duration and a pressure associated with the touch or swipe action. In some embodiments, the multimedia component 808 includes a front-facing camera and/or a rear-facing camera. When the UE 800 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 810 is configured to output and/or input audio signals. For example, the audio component 810 includes a microphone (MIC) configured to receive an external audio signal when the UE 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the UE 800. For instance, the sensor component 814 may detect an open/closed status of the UE 800, relative positioning of components, e.g., the display and the keypad, of the UE 800, a change in position of the UE 800 or a component of the UE 800, a presence or absence of user contact with the UE 800, an orientation or an acceleration/deceleration of the UE 800, and a change in temperature of the UE 800. The sensor component 814 may include a proximity sensor configured to detect the presence of nearby objects without any physical contact. The sensor component 814 may also include a light sensor, such as a Complementary Metal Oxide Semiconductor (CMOS) or Charge-Coupled Device (CCD) image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the UE 800 and other devices. The UE 800 can access a wireless network based on a communication standard, such as Wi-Fi, 2G or 3G, or a combination thereof. In an embodiment, the communication component 816 receives a broadcast signal or broadcast associated information from an external broadcast management system via a broadcast channel. In an embodiment, the communication component 816 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the embodiments, the UE 800 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described method.

In the embodiments, there is also provided a non-transitory computer readable storage medium including executable instructions, such as the memory 804, executable by the processor 820 in the UE 800, for performing the above method. For example, the non-transitory computer-readable storage medium may be a ROM, a Random Access Memory (RAM), a CD-ROM, a magnetic tape, a floppy disc, and an optical data storage device.

Figure 9:
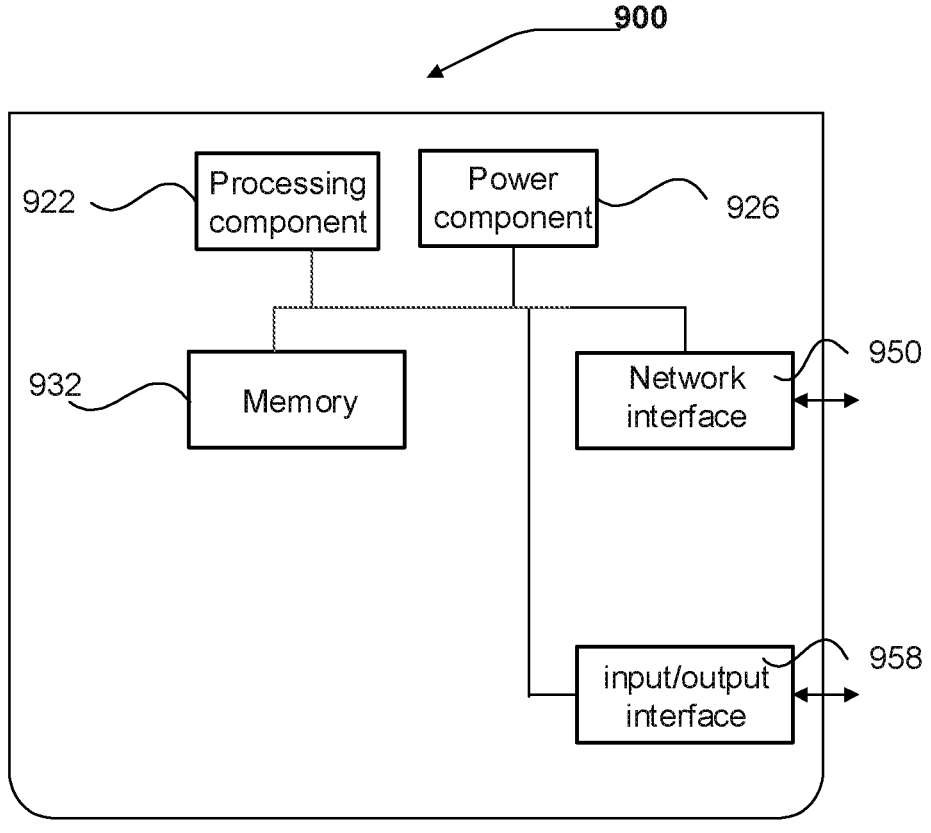
FIG. 9 is a schematic diagram illustrating a base station according to an embodiment.

FIG. 9 is a schematic diagram illustrating a base station according to an embodiment. For example, the base station 900 may be provided as a network side device. As illustrated in FIG. 9, the base station 900 includes a processing component 922 consisting of one or more processors, and memory resources represented by a memory 932 for storing instructions that can be executed by the processing component 922, such as applications. The application programs stored in the memory 932 may include one or more modules each corresponding to a set of instructions. In addition, the processing component 922 is configured to execute the instructions to perform any of the methods described above that are applicable to the base station, for example, the methods shown in FIG. 2A, FIG. 2B, FIG. 3, FIG. 4A, FIG. 4B to FIG. 5.

The base station 900 may also include a power component 926 configured to perform power management of the base station 900, a wired or wireless network interface 950 configured to connect the base station 900 to a network, and an input-output (I/O) interface 958. The base station 900 may operate based on an operating system stored in the memory 932, such as Windows Server™, Mac OS X™, Unix™ Linux™, FreeBSD™, or the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and embodiments are considered as examples only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for processing information, performed by a base station, comprising:

sending effective condition information for a reference signal, wherein the effective condition information is configured to indicate an effective condition for using the reference signal for a first use;

wherein the effective condition information comprises at least one of: first condition information, configured to indicate a first condition for allowing to use the reference signal for a Radio Resource Management (RRM) measurement; or second condition information, configured to indicate a second condition for allowing to use the reference signal for a synchronization between a user equipment (UE) and the base station;

wherein satisfying the first condition comprises: successfully receiving an effective indication carried by a paging Downlink Control Information (DCI) in response to determining that the first condition information does not carry threshold information; or receiving an effective indication carried by a paging DCI of a last Paging Occasion (PO) cycle.

2. The method of claim 1, wherein the reference signal comprises at least one of: a Tracking Reference Signal (TRS) or a Channel State Information Reference Signal (CSI-RS).

3. The method of claim 1, wherein the first use comprises at least one of: using the reference signal for the Radio Resource Management (RRM) measurement or using the reference signal for the synchronization between the User Equipment (UE) and the base station.

4. The method of claim 1, wherein the first condition information comprises: threshold information for allowing to use the reference signal for performing the RRM measurement;

wherein the threshold information is configured to indicate at least one of:

a signal-to-noise ratio threshold, wherein it is determined that the first condition for allowing to use the reference signal for the RRM measurement is satisfied in response to determining that a signal-to-noise ratio of the reference signal is greater than the signal-to-noise ratio threshold; or a time difference threshold range, wherein it is determined that the first condition for allowing to use the reference signal for the RRM measurement is satisfied in response to determining that a transmission time difference between the reference signal and a Synchronization Signal Block (SSB) is within the time difference threshold range.

5. The method of claim 1, wherein the effective condition information is configured based on a semi-static period configuration.

6. The method of claim 1, further comprising:

issuing a Downlink Control Information (DCI) for activating or deactivating a semi-static period configuration.

7. A method for processing information, performed by a user equipment (UE), comprising:

receiving effective condition information for a reference signal, wherein the effective condition information is configured to indicate an effective condition for using the reference signal for a first use;

wherein the effective condition information comprises at least one of: first condition information, configured to indicate a first condition for allowing to use the reference signal used for a Radio Resource Management (RRM) measurement; or second condition information, configured to indicate a second condition for allowing to use the reference signal for a synchronization between the UE and a base station;

wherein the first condition being satisfied comprises: an effective indication carried by a paging Downlink Control Information (DCI) being successfully received in response to determining that the first condition information does not carry threshold information; or an effective indication carried by the paging DCI of a last Paging Occasion (PO) cycle being received.

8. The method of claim 7, wherein the reference signal comprises at least one of: a Tracking Reference Signal (TRS) or a Channel State Information Reference Signal (CSI-RS).

9. The method of claim 7, wherein the first use comprises at least one of: using the reference signal for the Radio Resource Management (RRM) measurement or using the reference signal for the synchronization between the UE and the base station.

10. The method of claim 7, wherein the first condition information comprises: threshold information for allowing to use the reference signal for performing the RRM measurement.

11. The method of claim 10, wherein the threshold information is configured to indicate at least one of:

a signal-to-noise ratio threshold, wherein it is determined that the first condition for allowing to use the reference signal for the RRM measurement is satisfied in response to determining that a signal-to-noise ratio of the reference signal is greater than the signal-to-noise ratio threshold; or a time difference threshold range, wherein it is determined that the first condition for allowing to use the reference signal for the RRM measurement is satisfied in response to determining that a transmission time difference between the reference signal and a SSB is within the time difference threshold range.

12. The method of claim 7, wherein the effective condition information is configured based on a semi-static period configuration.

13. A base station, comprising:

a processor, a transceiver, a memory, and an executable program stored on the memory and executable by the processor, wherein when the executable program is executed by the processor, the processor is configured to:

send effective condition information for a reference signal, wherein the effective condition information is configured to indicate an effective condition for using the reference signal for a first use;

wherein the effective condition information comprises at least one of: first condition information, configured to indicate a first condition for allowing to use the reference signal for a Radio Resource Management (RRM) measurement; or second condition information, configured to indicate a second condition for allowing to use the reference signal for a synchronization between a user equipment (UE) and the base station;

wherein satisfying the first condition comprises: successfully receiving an effective indication carried by a paging Downlink Control Information (DCI) in response to determining that the first condition information does not carry threshold information; or receiving an effective indication carried by the paging DCI of a last Paging Occasion (PO) cycle.

14. A user equipment (UE), comprising:

a processor, a transceiver, a memory, and an executable program stored on the memory and executable by the processor, wherein when the executable program is executed by the processor, the processor is configured to perform a method of claim 7.

\* \* \* \* \*